United States Patent [19]

Ballard

[11] 4,338,227
[45] Jul. 6, 1982

[54] ETHYLENE COPOLYMER BLENDS AND ADHESIVES BASED THEREON

[75] Inventor: Edward C. Ballard, Wilmington, Del.

[73] Assignee: E. I. Du Pont de Nemours and Company, Wilmington, Del.

[21] Appl. No.: 257,112

[22] Filed: Apr. 24, 1981

Related U.S. Application Data

[63] Continuation-in-part of Ser. No. 184,547, Sep. 5, 1980, abandoned.

[51] Int. Cl.³ .................... C08L 23/08; C08L 23/16; C08L 33/02; C08L 33/04
[52] U.S. Cl. ................................ 524/143; 525/221; 525/222; 525/228; 525/192; 525/211; 525/210; 525/206; 525/194; 204/159.14; 428/514; 524/271; 524/522; 524/523; 524/524; 524/296; 524/314; 524/518
[58] Field of Search ............... 525/222, 228, 221, 192, 525/210, 211, 206; 204/159.14; 260/23 AR

[56] References Cited

U.S. PATENT DOCUMENTS

| | | | |
|---|---|---|---|
| 3,342,902 | 9/1967 | Peterkin | 260/897 |
| 3,445,263 | 5/1969 | Alexander | 117/47 |
| 3,515,270 | 6/1970 | Tonn et al. | 206/56 |
| 3,630,980 | 12/1971 | Russell | 260/27 |
| 3,644,252 | 2/1972 | Shenfeld et al. | 260/27 |
| 3,792,002 | 2/1974 | Krieger et al. | 260/18 |
| 3,849,353 | 11/1974 | Taft et al. | 260/27 |

FOREIGN PATENT DOCUMENTS

845755  6/1970  Canada .................................. 400/1

OTHER PUBLICATIONS

"Technical Information Letter #3842", Aug. 1, 1966, Pennsylvania Industrial Chemical Corp.
R. J. Litz, "EVA Systems for Hot Melt Pressure-Sensitives Adhesives", Adhesives Age, Aug., 1971, (pp. 32-34).
R. J. Litz, "Hot Melt Pressure-Sensitive Adhesives Based on EVA Copolymers", Tappi, vol. 57, Jun. 1974, (pp. 84-86).
R. J. Litz, "Developments in Ethylene-Based Hot Melt Adhesives", Adhesives Age, Aug. 1974, (pp. 35-38).
M. R. Rifi, "Pressure Sensitive Adhesives Structure-Performance Relationship" 1976 Fall Seminar of Adhesives & Sealant Council.
M. R. Rifi, "Pressure Sensitive Adhesives Structure vs. Performance", Tappi Western Hot Melt Meeting, Nov. 1977.
R. E. Duncan & J. E. Bergerhouse, "EVA & VA Copolymers for Hot Melt PSA's" Adhesives Age, Mar. 1980, (pp. 37-41).
J. Miron & I. Skeist, "Trends in Pressure Sensitive and Heat Seal Materials" Adhesives Age, Jan. 1978, (pp. 35-38).
A. Maletsky & G. J. Villa, "Pressure Sensitive Hot Melt Adhesives-Background, Current & Future Potential" Pressure Sensitive Tape Council Meeting, Washington, D.C., Mar. 5, 1975.
J. A. Collins, "Hot Melt Application and End Use Requisites: Their Characterization and Measurements", Tappi HMPSA Short Course, Boxborough, Mass., May 5, 1976.
C. Watson, "Evaluation and Selection of Pressure Sensitive Hot Melt Adhesives", Tappi 1977, Cavalcade of Hot Melts.
B. H. Gregory, "A Review of the Status and Development of EVA Copolymers", Tappi Hot Melt Conference at Antwerp, Belgium.

*Primary Examiner*—Carman J. Seccuro

[57] ABSTRACT

Homogeneous blends of at least two non-crosslinked ethylene copolymers having different polar comonomer contents are mildly crosslinked to reduce their melt index. The crosslinked blend can be mixed with tackifier, plasticizer, filler and antioxidant to yield hot melt pressure sensitive adhesive compositions. In the alternative, at least one of the two ethylene copolymers can be crosslinked prior to blending in the hot melt pressure sensitive adhesive composition.

18 Claims, No Drawings

ETHYLENE COPOLYMER BLENDS AND ADHESIVES BASED THEREON

This application is a continuation-in-part of my co-pending application Ser. No. 184,547 filed Sept. 5, 1980, now abandoned.

BACKGROUND OF THE INVENTION

1. Field of the Invention

This invention relates to ethylene copolymers and more specifically, it relates to blends of ethylene copolymers at least one of which is crosslinked and adhesives based thereon.

2. Description of the Prior Art

Ethylene/vinyl acetate (E/VA), and, to a considerably lesser extent, ethylene/ethyl acrylate (E/EA) copolymers have been considered for use in pressure sensitive adhesives for more than 13 years ("Technical Information Letter #3842," Aug. 1, 1966, Pennsylvania Industrial Chemical Corp.). This reference from the Pennsylvania Industrial Chemical Corporation presents data on blends of Elvax ® 40 (E/VA, 40 wt % VA, 57 MI) with various "Picco" hydrocarbon tackifying resins. Of six resins tested the data indicate that "Piccovar" L60 was the best of the group and that an Elvax ® 40/"Piccovar" L60 ratio of 40/60 gave better performance than 50/50 or 60/40 ratios. The other tackifying resins in this program were:

"Picco" 25
"Piccovar" L30
"Piccolastic" A25
"Piccolastic" A50
"Piccolastic" A75

Formulations based on E/VA copolymers are covered in three articles by R. J. Litz of Union Carbide Corp. ("EVA Systems for Hot Melt Pressure-Sensitive Adhesives," R. J. Litz, Adhesives Age, August 1971, pages 32–4; "Hot Melt Pressure-Sensitive Adhesives Based on EVA Copolymers," R. J. Litz, TAPPI Vol. 57, pages 84–86, June 1974; "Developments in Ethylene-Based Hot Melt Adhesives," R. J. Litz, Adhesives Age, August 1974, pages 35–38). In these publications formulations are given which contain:

|   |            | Parts by Weight |
|---|------------|-----------------|
| 1.| Polymer    | 35–50           |
| 2.| Tackifier  | 30–50           |
| 3.| Stabilizer | 0.1–0.5         |
| 4.| Plasticizer| 0–20            |
| 5.| Filler     | 0–5             |

The use of two different EVA copolymers (neither of which was crosslinked) with different vinyl acetate contents and melt indices is described in the June 1974 publication. One formulation contained:

|              | Parts by Wt. | VA, Wt. % | Melt Index |
|--------------|--------------|-----------|------------|
| Co-Mer EVA-501 | 15         | 28        | 350        |
| Co-Mer EVA-605 | 30         | 33        | 20         |

The use of copolymer blends of different melt index was stressed more than the use of copolymers with different VA contents. Copolymers with VA contents of over 33% were not mentioned.

Rifi of Union Carbide Corp. ("Pressure Sensitive Adhesives-Structure-Performance Relationship," M. R. Rifi, presented at the 1976 Fall Seminar of the Adhesive & Sealant Council; "Pressure Sensitive Adhesives-Structure vs Performance," M. R. Rifi, presented at the TAPPI Western Hot Melt Meeting, November 1977) discussed hot melt pressure sensitive adhesives based on E/EA copolymers. A series of three compositions containing 35, 42.5 and 50 wt % of Carbide's "DPDA" 2304 all used "Piccovar" L60 as the tackifier. "DPDA" 2304 is an E/EA polymer with a 20 MI and containing 23 wt % EA. Rifi also discussed the performance of E/VA-based pressure sensitive adhesives using EVA-605 and EVA-501, as well as those using blends of 605 with 501 and blends of E/VA with E/EA polymers. None of these copolymers were crosslinked.

The formulation work described by Litz and Rifi primarily was based on 28 and 33 wt % VA copolymers. However, Duncan and Bergerhouse of U.S. Industrial Chemicals Co. ("EVA and VAE Copolymers for Hot Melt PSA's," R. E. Duncan and J. E. Bergerhouse, Adhesives Age, March 1980, pages 37–41) reported data on a much more comprehensive study of hot melt pressure sensitive adhesive formulation. This study included E/VA copolymers containing 18, 28, 33, 40, 50 and 60 wt % VA blended in 3 different ratios with 50 representative tackifying resins of the classes:

Rosins
Esters of hydrogenated rosins
Esters of polymerized rosins
Terpene hydrocarbon resins
Aliphatic hydrocarbon resins
Aromatic hydrocarbon resins
Terpene phenolic resins
Styrene-based resins In none of these papers published by Carbide and USI on HMPSA based on E/VA and E/EA copolymers has the very serious problem of adhesive bleed into the label stock or into the substrate to which it is applied been mentioned. Poor performance in bleed tests of formulations such as they discuss has kept their use in the HMPSA label market at a very low level.

Meron and Skeist ("Trends in Pressure-Sensitive and Heat Seal Materials," J. Miron and I. Skeist, Adhesives Age, pages 35–38, January 1978) state "The first efforts to make pressure sensitive hot melts concentrated on tackifying and plasticizing EVA, ethyl cellulose or acrylics but the products obtained showed poor cohesion and excessive cold flow." Maletsky and Villa ("Pressure Sensitive Hot Melt Adhesives-Background, Current and Future Potential," A. Maletsky and G. J. Villa, presented at the Pressure Sensitive Tape Council Meeting, Washington, D.C., March 5, 1975) came to the same conclusion about E/VA based HMPSA stating they showed too much cold flow at 120°–140° F. to be of general utility.

Two interesting articles ("Hot Melt Application and End Use Requisites: Their Characterization and Measurements," J. A. Collins, presented at the TAPPI HMPSA Short Course, Boxborough, Mass., May 5, 1976 and "Evaluation and Selection of Pressure Sensitive Hot Melt Adhesives" C. Watson, presented at the TAPPI 1977 Cavalcade of Hot Melts) have been published in the last several years concerning the evaluation and selection of HMPSA. Both authors mention the importance of bleed tests at 140° F. in determining the merit of HMPSA. Collins states:

"For manufacturers of products that coat PSA HM's on porous substrates such as paper a bleeding test should be used. PSA's that do not age well may bleed or stain the porous substrates. This becomes especially critical when the coated substrate is wound tightly in a web. This test is important because, when the adhesive penetrates, it may leave less effective film thicknesses and discolor the face stock. The result can be a drop in tack, peel strength, quick stick and aesthetic appearance. This test is usually run by exposing a given area, usually a 2 sq. in. section to a given temperature, usually 140° F., for 14 days. These conditions can be altered to fit the needs of a specific end user. After the aging period the samples should be evaluated for color change, peel adhesion, shear adhesion, quick stick and tack. This is done by comparing the tested sample with a control coated sample."

B. H. Gregory, USI Europe N.V. ("A Review of the Status and Development of EVA Copolymers," B. H. Gregory, presented at the 1979 TAPPI Hot Melt Conference at Antwerp, Belgium) presented a paper at the 1979 TAPPI Antwerp Conference on Hot Melts in which he compared blending two or more E/VA copolymers (none of which were crosslinked) of suitable MI and VA levels so as to match the MI and VA level of a single, directly synthesized, polymer. He says that by blending of any two or three grades in the range of about 10 to 40% VA and 3 to 600 MI the mechanical and thermal properties of the copolymer blend essentially match those of a single copolymer prepared by direct synthesis to match the MI and VA content of the blend.

Many patents, both U.S. and foreign, have been issued covering E/VA and E/acrylates in pressure sensitive adhesive formulations.

U.S. Pat. No. 3,342,902 discloses a hot melt adhesive having pressure sensitivity is a blend of atactic polypropylene, an E/VA copolymer and a polyterpene resin.

U.S. Pat. No. 3,445,263 discloses PSA tapes prepared by hot melt coating high density polyethylene with an adhesive based on an E/VA copolymer and hydrogenated wood rosin esters.

U.S. Pat. No. 3,515,270 discloses HMPSA formulation that includes an E/VA copolymer and a low molecular weight polystyrene resin.

U.S. Pat. No. 3,630,980 discloses a HMPSA that includes an E/VA copolymer, a resinous rubbery block copolymer of styrene with butadiene or isoprene, and a third component which may be a modified or unmodified rosin, a coumarone/indene resin, a polyterpene resin, a diene-olefin hydrocarbon resin or a polystyrene.

U.S. Pat. No. 3,644,252 discloses a HMPSA composition that includes a primary polymer which is a random copolymer of styrene and isobutylene and a secondary polymer which may be an E/VA copolymer, an E/alkyl acrylate copolymer, a polyvinyl alkyl ether or a terpolymer of E/VA/AA or E/VA/MAA.

U.S. Pat. No. 3,792,002 discloses a HMPSA composition that includes a polyamide resin, a tackifier, a second polyamide or polyester amide and/or an E/VA copolymer.

U.S. Pat. No. 3,849,353 discloses a HMPSA that includes a copolymer of E/VA and/or an alkyl acrylate, atactic polypropylene, and a vulcanized rubber such as butyl rubber.

Canadian 845,755 discloses a HMPSA that includes a resinous E/VA copolymer, a modified or unmodified rosin, a coumarone-indene resin or a polystyrene resin.

SUMMARY OF THE INVENTION

According to the present invention there is provided a composition consisting essentially of a homogeneous blend of at least one ethylene copolymer (A) and at least one ethylene copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a polar comonomer content of from about 25 to about 50 percent by weight, an ethylene content of from about 50 to about 75 percent by weight and a melt index of from about 3 to about 200, and copolymer (B) having a polar comonomer content of from about 10 to about 33 percent by weight, an ethylene content of from about 67 to about 90 percent by weight and a melt index of from about 1 to about 100, provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, said homogeneous blend of copolymers (A) and (B) having been mildly crosslinked to reduce the melt index of said blend by a factor of from about 2 to about 150.

Further provided according to the present invention are compositions consisting essentially of (a) from about 14 to about 60 percent by weight of a homogeneous blend of at least one ethylene copolymer (A) and at least one ethylene copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a minimum polar comonomer content that is sufficient to yield the desired tack in pressure sensitive adhesive formulations and having a maximum polar comonomer content that will still maintain the desired bleed resistance when used in the formulation of this claim and a melt index of from about 3 to about 200, and copolymer (B) having a polar comonomer content of from about 10 to about 33 percent by weight, an ethylene content of from about 67 to about 90 percent by weight and a melt index of from about 1 to about 100, provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, said homogeneous blend of copolymers (A) and (B) having been mildly cross-linked to reduce the melt index of said blend by a factor of from about 2 to about 150;

(b) from 0 to about 25 percent by weight of filler;

(c) from 0 to about 5 percent by weight of antioxidant;

(d) from about 40 to about 86 percent by weight of tackifier; and (e) from about 0 to about 25 percent by weight of plasticizer.

Still further provided according to the present invention are compositions consisting essentially of (a) from about 14 to about 60 percent by weight of a mixture of at least one ethylene copolymer (A) and at least one ethylene copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a minimum polar comonomer content that is sufficient to yield the desired tack in pressure sensitive adhesive formulations and having a maximum polar comonomer content that will still maintain the desired bleed resistance when used in the formulation of this claim and a melt index of from about 3 to about 200, and copolymer (B) having a polar comonomer content of from about 10 to about 33 percent by weight, an ethylene content of from about 67 to about 90 percent by weight and a melt index of from about 1 to about 100; provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, at least one copolymer of said copolymer(s) (A) and copolymer(s) (B) having been mildly crosslinked to reduce its melt index by a factor of from about 2 to about 200 for copolymer(s) (A) and by a factor of from about 2 to about 100 for copolymer(s) (B) such that at least 15 percent of copolymer, based upon the weight of total copolymer, is crosslinked;

(b) from 0 to about 25 percent by weight of filler;

(c) from 0 to about 5 percent by weight of antioxidant;

(d) from about 39 to about 85 percent by weight of tackifier; and (e) from about 0.5 to about 25 percent by weight of plasticizer.

As used herein the term "consisting essentially of" means that the named ingredients are essential; however, other ingredients which do not prevent the advantages of the present invention from being realized can also be included.

DETAILED DESCRIPTION OF THE INVENTION

Hot melt pressure sensitive adhesive (HMPSA) formulations based on ethylene/vinyl acetate (E/VA) copolymers have been available for more than 13 years. They have had but little commercial acceptance because paper labels based on them tend to bleed, particularly at mildly elevated temperatures, and lose their pressure sensitive performance.

It has now been found that formulations based on at least two E/VA copolymers containing different VA contents (40 wt% VA and 28 wt% VA, for example), at least one of the copolymers being crosslinked, do not show this bleeding tendency. They maintain satisfactory pressure sensitive adhesive performance after 14 days aging at 60° C. whereas the old type formulations would fail by excessive bleeding into the label stock in less than a day at 60° C. This desired resistance to bleed is not met by use of a single copolymer of intermediate VA content which has been crosslinked to match the melt viscosity of satisfactory blends based on two crosslinked E/VA copolymers of suitably different VA contents.

HMPSA formulations based on the present invention are particularly useful in the production of permanent type labels.

The present invention relates to pressure sensitive adhesive formulations in which (a) the total copolymer content is in the range of from about 14 to about 60 (preferably from about 20 to about 40 and most preferably from about 25 to about 35 weight percent of the total adhesive which consist essentially of at least two ethylene-based copolymers which differ significantly in polar comonomer content (at least by 5 wt. percent) with the lesser of the two copolymers being present in at least about 10 weight percent, preferably at least about 15 weight percent and most preferably at least about 30 weight percent of the total copolymer content. Relatively small amounts of additional ethylene-based copolymers can also be present in the adhesive. At least about 15% preferably at least about 25% of the total copolymer present in the adhesive has been mildly crosslinked so as to reduce its MI by a factor of at least two; (b) inorganic or organic fillers are present in the range of from 0 to about 25, preferably from 0 to about 20 weight percent; (c) antioxidants and UV Light stabilizers are present in the range of from 0 to about 5, preferably from about 0.1 to about 2 weight percent depending on their need; (d) the tackifiers(s) (preferably a blend, of two or more) content is in the range of from about 39 to about 86 weight percent (preferably from about 50 to about 80 or from about 49 to about 79 weight percent, respectively, depending on whether the blend of ethylene copolymers or the individual ethylene copolymer has been mildly cross-linked and most preferably from about 54 to about 74 weight percent, when the individual ethylene copolymer has been mildly cross-linked); and (e) liquid, to semi-liquid plasticizers are present in the amount of from about 0.5 to about 25 weight percent (preferably from 0 to about 20 or from about 1 to about 20 weight percent, respectively, depending on whether the blend of ethylene copolymers or the individual ethylene copolymer has been mildly cross-linked).

The present invention relates to pressure sensitive adhesives in which the ethylene-based copolymers (two or more in number) that give adhesive strength to the formulation contain significantly different comonomer contents. At least one of these copolymers must be mildly crosslinked to increase its molecular weight (lower its MI by a factor of at least two). The ethylene copolymers suitable for the composition of the present invention are copolymers with at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms. Terpolymers of ethylene and the above polar comonomers are also suitable. In addition, terpolymers of ethylene/vinyl acetate/carbon monoxide containing up to about 15 percent by weight of carbon monoxide can also be employed. Thus, comonomers suitable for use in the preparation of these ethylene copolymers include the vinyl esters of the lower molecular weight aliphatic acids such as acetic, propionic or butyric acid. They also can include the lower aliphatic alcohol esters of unsaturated acids such as acrylic, methacrylic and maleic acid. The aliphatic alcohols would include methyl, ethyl, propyl, as well as normal, iso, secondary and tertiary butyl alcohols.

In accordance with the above, suitable ethylene copolymers are such as ethylene/vinyl acetate, ethylene/acrylic acid, ehtylene/methacrylic acid, ethylene/methyl acrylate, ethylene/ethyl acrylate, ethylene/isobutyl acrylate, ethylene/methyl methacrylate, ethylene/vinyl acetate/methacrylic acid, and ethylene/vinyl acetate/carbon monoxide. Particularly suitable copolymers are ethylene/vinyl acetate, ethylene/ethyl acrylate, ethylene/methyl acrylate, ehtylene/isobutyl acrylate and ethylene/methyl methacrylate copolymers.

These polymers are made in a process similar to the well known high pressure free radical initiated process used in the commercial production of low density polyethylene. Polymerization pressures are usually in the range of 1000 to 2500 atmospheres and temperatures in the range of 120° to 250° C.

The comonomer contents of the two copolymers are selected so that one of the copolymers [(copolymer (A)] is an adhesive promoting copolymer and contains sufficient comonomer so as to essentially eliminate ethylenic crystallinity by reducing the number of uninterrupted repeating ethylene (—CH$_2$—CH$_2$—) units in the copolymer chain to a level where they no longer readily develop a crystalline structure and/or to soften the copolymer to such an extent that it is easily converted into a permanently pressure sensitive state by the addition of tackifiers. In the case of E/VA this comes out to about 30–44 wt % VA (12.2–20.4 mole % VA), preferably about 38–42 wt % VA (16.6–19.1 mole % VA).

Different comonomers behave somewhat differently and it is not possible to specify a single comonomer content range that will cover all copolymers useful in this invention. The MI of the first copolymer [copolymer (A)] before crosslinking should be in the range of from about 3 to about 200, preferably from about 30 to about 90. If this copolymer is used in its crosslinked form its MI should be decreased in the crosslinking process by a factor in the range of from about 2 to about 200, preferably by a factor within the range of from about 10 to about 100. It should not be so deeply crosslinked that it contains sufficient gel to interfere with the production of adhesives which will give smooth coatings on paper, film or foil substrates.

The comonomer content of the strength producing (second) copolymer [copolymer (B)] is selected so that it is significantly lower than that of the adhesive promoting copolymer. In the case of E/VA this corresponds to a weight % VA range of from about 10 to about 33% (3.5 to 14.2 mole % VA), preferably in the range of from about 18 to about 28 weight percent VA (6.7 to 11.2 mole %). The MI of this second copolymer should be in the range of from about 1 to about 100, preferably in the range of from about 2 to about 25 before being crosslinked—so as to contribute strength to the adhesive. If crosslinked this copolymer should be lowered in MI by a factor in the range of from about 2 to about 100, preferably by a factor within the range of from about 10 to about 60.

In any given blend the polar comonomer content of copolymer (A) has to be at least 5 percent by weight higher than the polar comonomer content of copolymer (B).

Additional copolymers can be used as part of the total copolymer content, the comonomer content and MI of these additional copolymers being selected to alter the performance of the pressure sensitive adhesive as necessary to fit special performance requirements. They may or may not be crosslinked and will only be used as a relatively small portion (not more than 35%) of the total copolymer content.

Copolymers(s) (A) and (B) described above can be melt blended and pelletized before being crosslinked. The copolymer blend should contain at least 10 weight percent of the copolymer present in the lesser amount. The MI of the melt blend of the two copolymers should then be reduced by a factor of at least about two but not over about 150. A preferred range of MI reduction would be by a factor within the range of from about 10 to about 100.

Such mildly crosslinked blends of neat copolymers can be used in blown films, blow molded articles, heat shrinkable films, heat sealable films, filaments and tapes for energy absorption, elastic films and filaments.

In the mildly crosslinked blends of neat copolymer(s) (A) and copolymer(s) (B) the polar comonomer content of copolymer (A) is from about 25 to about 50 percent by weight (the ethylene content being from about 50 to about 75 percent by weight) and the polar comonomer content of copolymer (B) is from about 10 to about 33 percent by weight (the ethylene content being from about 67 to about 90 percent by weight) provided that the polar comonomer content of copolymer (A) is at least 5 percent by weight higher than the polar comonomer content of copolymer (B).

In addition to the ethylene copolymers present in the adhesive, the adhesive contains one or more tackifier resins to generate a reasonable level of pressure sensitive performance. It can also contain one or more liquid or semi-liquid plasticizers to modify or adjust pressure sensitive performance to the level required for the use to which the adhesive will be put. It can also contain a low level of one or more antioxidants to protect the stability of the adhesive when in the molten state, or during long term storage in bulk form and/or after the adhesive has been applied to the base stock and/or the adhesive coated base stock (paper, film or foil) has been put into use.

Tackifiers suitable for use in the formulations of the present invention include:
 a. Wood, gum or tall oil derived rosin acids. They can be hydrogenated, disproportionated or mildly polymerized.
 b. Esters of the various classes of rosin acids referred to above. Alcohols suitable for preparing these esters include mono- and polyethylene glycols, glycerol, pentaerythritol and related products.
 c. Terpene resins.
 d. Dicyclopentadiene-aromatic hydrocarbon resins such as those described in U.S. Pat. No. 3,023,200 covering "Piccovar" resin manufactured by Pennsylvania Industrial Chemical Co.

e. Low molecular weight resins based on styrene and/or substituted styrenes.

Plasticizers suitable for use in the formulations of the present invention include:

a. Typical phthalates, azelates, adipates, tricresyl phosphate, and polyesters, such as those used in flexibilizing polyvinyl chloride.

b. Low molecular weight resins made from alkylated phenols, phenol modified coumaroneindene, terpenes and synthetic terpenes.

c. Petroleum derived processing oils. These oils are widely used in the compounding and/or extending of rubber compositions. They are generally classed as aromatic, naphthenic or aliphatic in character, the classification just identifying the major oil type present. They are available over a wide range of viscosities, from as low as 60, to over 15,000 SUS viscosity at 100° F. (37.8° C.). The type of oil and its viscosity both have some effect on the performance of the HMPSA in which it is used. Generally speaking, oils with a viscosity of greater than 200 SUS at 100° F. (37.8° C.) are of most use in the compositions of this invention.

Suitable antioxidants include typical hindered phenols such as butylated hydroxytoluene (BHT), "Ethyl" 330, Geigy "Irganox" 1010, etc. as well as phosphites, butyl zimate, etc.

Mild crosslinking of the polymers so that they are satisfactory for use in this invention can be accomplished in several ways, such as:

a. High energy radiation as described in U.S. Pat. No. 3,734,843.

b. Peroxide generated free radicals as described in U.S. Pat. No. 3,988,509.

c. Mechanically working the polymer below its degradation temperature as described in U.S. Pat. No. 3,968,091.

d. UV light radiation, etc.

Pressure sensitive adhesives prepared according to this invention can be applied to the desired substrate from a melt, organic based solution or an aqueous dispersion.

The formulated blends of the present invention are also useful as tape adhesives, floor covering adhesives, semi-structural adhesives, elastic hot melts, bookbinding adhesives, coatings and hot melt sealants.

Many tests are described in the literature as being of use in the evaluation of pressure sensitive adhesive performances. Some are covered in the manual issued by the Pressure Sensitive Tape Council (PSTC). Others are given in TAPPI and ASTM publications.

Our laboratory evaluation program for pressure sensitive adhesive candidates involves three sequences:

(1) Adhesive blend preparation
  a. small scale
  b. large scale
(2) Coating the adhesive onto test substrates
(3) Adhesive testing These sequences are described in further detail below. It is very important to remember that a successful pressure sensitive adhesive must not only exhibit good adhesive performance, but it also must resist bleeding into any porous label or tape shock on which it is coated. It further must resist bleeding into any porous substrate to which the label or tape is attached.

Pressure sensitive labels and tapes frequently are shipped, stored and used under relatively warm conditions. It is quite customary to evaluate the aging and bleeding tendencies of pressure sensitive adhesives by subjecting them to storage at 60° C. for relatively long periods. An aging period of 14 days at 60° C. has been described in the literature. The tendency of the adhesive to bleed into the label or tape stock and/or the substrate to which the adhesive is bonded is rated after this aging period. Any significant bleeding noted at the end of this period greatly limits, or completely eliminates, consideration of the adhesive for practical, commercial use. Not only does bleeding make the label or tape unsightly, but bleeding of the adhesive into the substrates starves the bond of adhesive and the label or tape can eventually fall off the substrate to which it originally was attached.

As will be seen in the following examples the E/VA based pressure sensitive adhesives which have been described in the literature during the past 10–15 years fail the 60° C. bleed test. They exhibit severe bleeding tendencies and are not practical adhesive candidates. The adhesives which are the subject of this invention pass the 14 day, 60° C. tests without bleeding and are practical, useful pressure sensitive adhesives.

HMPSA Preparation

Preparation of Small Quantities

Laboratory blends are typically prepared in new ½ pint paint cans which have had their rims cut off flush with the can wall. One hundred gram blends are normal; 170 g blends are the maximum conveniently prepared in these cans. From one to four blends are prepared at one time, the cans being heated in a temperature controlled aluminum block with four holes sized to be a close fit for the cans. The block is typically controlled at 200° C., giving a melt temperature of 150° to 160° C. for the blends in preparation. The blends are stirred with three bladed commercial propeller agitators powered with air motors working through reduction gears.

In blend preparation all the tackifying resins, plasticizers and antioxidants are placed in the can, melted and brought to temperature. Agitation is started as soon as the tackifiers have melted. The polymer beads are sprinkled into the agitated mixture during a one or two minute period after the melt is at approximately 150° C. Blends are completed usually within a one to two hour period after adding the polymer. Blend viscosities are measured with an RVT Brookfield viscometer and Brookfield "Thermosel".

In cases where plasticizers are also used in the formulation they are added along with the tackifier(s) at the start of blending. Other soluble additives, such as UV light stabilizers, etc., can be added toward the end of the blending cycle. Inorganic fillers, when used, are added after all other ingredients have been added and mixed into the melt.

Preparation of 5 to 13 kg Blends

Blends of larger size, are prepared in new five-gallon paint pails. These are heated in commercially available five-gallon can warmers. The techniques and blending temperatures used for these larger blends are very similar to those used for 100 g blends. The agitator is a square sided "U" rather than a propeller. It is driven by a heavy duty geared air motor. The lower agitation power used in these blends can double the time required to complete a formulation as compared to that taken in preparing 100 g samples.

The blends, once prepared, can be stored in the pails in which they were made or poured into 4" diameter 12" long release paper lined paper board cartons (metal bottoms) which are commercially available from several suppliers.

Laboratory Coating Procedure

The simplest laboratory procedure for applying hot melt pressure sensitive adhesives to paper, film or foil substrates involved use of a doctor blade to make draw downs of the molten adhesive on release paper. The paper was held on the flat ground surface of a 9"×12" (22.5×30 cm) hot plate at 150° C. Various grades of wire wound rods also could be used to make these draw downs and control coating thickness, usually in the range of 0.001–0.002 inches (0.0025–0.0050 cm). The coated release paper then, while the adhesive was still molten, was covered with a smooth section of "Kromekote" label paper (60 lb/3000 square feet, obtained from Champion International Corp.), Mylar ® polyester film (0.0025 or 0.0050 cm thick, available from the Du Pont Co.), aluminum foil or other substrate. The resulting laminated system was immediately removed from the hot plate and cooled while being held flat. A release paper suitable for this use was Thilmany Semi BL 40E Silox IFFO Deluxe. The laminated structure, on cooling, had the adhesive firmly bound to the second substrate. It could be evaluated in tests, such as described in following sections, after peeling off the release paper.

The coating procedure described above was mechanized by using an electrically heated doctor blade held just above an electrically heated bed plate to apply the adhesive layer to a roll of 6.5 inch (16.2 cm) wide release paper. A 50 gram puddle of molten adhesive was held, by means of a dam, at the gap between the doctor blade and bed plate. The release paper was pulled through the gap, at 10–20 feet (3–6 m) per minute, by means of an electrically driven take-up roll. The release paper was thus covered with a controllable thickness of adhesive. It was laminated in-line with the coating operation to a second paper, film or foil. This was done by mating the hot adhesive coated release paper to the second substrate and running the resulting sandwich structure through a spring loaded heated nip of one steam heated and one silicone rubber coated roll. The final laminated structure was wound up on the take-up roll. From 2 to 10 m of the test substrates were usually coated by this method and used in adhesive evaluation.

Coating thicknesses were controlled by use of adjustment screws to set the clearance between the doctor blade and the bed plate. The doctor blade and bed plate were prepared from stress relieved, nonmagnetic stainless steel carefully ground flat and true to very close tolerances. Adhesive thicknesses during the coating operation were measured by using a hand held, dial reading, thickness gauge capable of being read to 0.00025 cm. The dial was zeroed at the thickness of the release paper plus the thickness of the second substrate. Thus adjusted, measuring the thickness of the final laminate gave a direct reading on the thickness of the adhesive layer. Other methods of measuring adhesive thickness are available and could be applied to the final sandwich but were not useful in measuring and adjusting adhesive thickness during the coating operation. Uniform adhesive layers of 0.9 to 1.3 mils (0.0009–0.0013 inches) were normally attained when using this coater at 150° C. to apply adhesives in the viscosity range of 1 to 200 Pa.s at 150° C.

Evaluation of Adhesive Performance Tests Run at Room Temperature (20°–25° C.) Finger Tack A subjective test widely used to measure, by feel, the pressure tack of adhesive coated labels and tapes.

"Polyken" Tack

The standard procedure is given in ASTM D 2979-71. The travel speed of the probe is 1.0 cm/second and the dwell time for the probe in contact with the adhesive is 1.0 second. The annular ring weight normally used weighs approximately 20.0 g, corresponding to a 100 g/sq cm load on the probe. Other weights are available. At least three determinations are made on each coated substrate tested. Acetone is a satisfactory solvent (or softener) for cleaning the probe and the surface of the annular ring weight of any residual adhesive.

In our program the tests were under laboratory conditions of temperature and humidity. We did not observe really significant changes in "Polyken" Tack over the range of 65° F. to 80° F. (18° to 27° C.). However, it was considered advisable to test all the samples in any given series within a reasonably short period of time during a single day.

Substrates, after coating with adhesive, should be allowed to age at least overnight in the laboratory before being tested for adhesive performance. In at least some cases, tests run on coatings only an hour or two old did not agree with data obtained on samples which had aged overnight. For permanent type HMPSA "Polyken" Tack of at least 300 g is desirable.

Rolling Ball Tack

The procedure followed is that of PSTC-6. We found that ambient temperature variations had a significant effect on the test - more than on the "Polyken" Tack test. Therefore, this test was run in a room controlled at 73° F. (23° C.) and 50% RH. Performances of commercial permanent PSA vary widely (from <5 cm to >50 cm). Less than 20 cm rolling ball tack would be desirable.

Shear Adhesion Time

This test was run as described in PSTC-7 except that the test panels were mounted vertically and the shear was thus at 180° rather than at a 178° angle. The adhesive contact area on the test panel was 0.50×0.50 inches (1.27×1.27 cm). A one pound (454 g) weight was hung on the strip. The fail time was indicated when the strip in shear parted from the panel and allowed the weight to fall on a switch which stopped an electric counter (reading in tenths of a minute). Two tests normally were run on each adhesive sample. If the results were widely divergent, one or more additional tests would be run on additional samples of the same coated stock. Tests still running after 24 hours (1440 minutes) were discontinued. Fail times of >120 minutes are desirable.

Peel, 180° Angle

The procedure followed is that of PSTC-1, using 1.0" (2.54 cm) wide strips. The bonds were pulled in an "Instron" Tester within one minute after they were prepared. When studying adhesive coated "Kromekote" label paper the test was started without attempting to peel back a section of the paper (recommended in PSTC-1). This was done because many of our adhesive formulations gave paper failing bonds when attempting to peel in preparation of starting the test. When the test substrate was Mylar ® film the official PSTC-1 procedure was used. Peel strengths of greater than 600 g/cm (or paper failing bonds) are desirable for permanent label adhesives.

Glass Mandrel (½"; 1.27 cm) Adhesion

This test used 12 inch long mandrels of ½ inch diameter "Pyrex" glass tubing. One inch by one inch labels cut from adhesive coated "Kromekote" stock were firmly pressed with a finger onto the freshly acetone-cleaned mandrels. The mandrels were clamped horizontally in a fixture for 24 hours. The labels were then inspected on the mandrels and rated for the extent the label had lifted from the glass. Because the two ends may lift somewhat differently, we reported total lift (adding both ends together) in sixteenths of an inch. Desirable performance is 2/16" (3.2 mm) or less, total lift.

Fourteen Day Aging Tests Run at 60° C.

Adhesion and Bleed When Bonded to Corrugated Board

One inch by four inch (2.54×10 cm) strips of adhesive coated "Kromekote" label paper are cut and applied to suitable sections of new, unused corrugated board (275 lb per sq inch bursing strength, 110 lb/1000 sq ft). They are adhered to the board by gentle thumb or finger pressure. The samples are then stored in a circulating air oven that is maintained at 60°±0.5° C.

At periodic intervals, as for example, 1, 3, 5, 7 and 14 days, the corrugated board panels are removed briefly from the oven and inspected for signs of the adhesive bleeding through the label paper. Final inspection is made after 14 days in the 60° C. oven. Any recognizable pinpoint sized spots of bleed causes the label to be rated as showing "trace" bleed. This level of bleed, in general, would not be acceptable. Some adhesives can bleed so badly that all the adhesive soaks into the label paper and/or the corrugated board. When this happens, the label loses all tack and is blown off the corrugated board by the current of circulating air in the oven. If this tendency is apparent it is well to staple one end of the label to the corrugated board.

When the labels are periodically inspected for bleed they are also checked for signs of loosening from the corrugated board. This can be in the form of tunnels, edge lift and/or end lift. A brief description of the type and extent (%) of adhesion failure is noted. The labels, to be satisfactory should not show any sign of adhesion failure.

Bleed When Aged on Release Paper; Adhesion Performance After Aging

In this test 3"×6"(7.5×15 cm) samples of "Kromekote"-adhesive-release paper are stacked, one layer deep, between sections of corrugated board (to hold them flat). The stacks of corrugated board, either taped, or held together by weight are stored in a circulating air oven held at 60° C.±0.5° C. At seven days they are removed briefly from the oven and inspected for signs of adhesive bleeding into the "Kromekote" label paper. The test samples are then returned to the oven for an additional seven day period. At 14 days the test is terminated and the samples are removed from the oven and rated for bleed. Again, even a trace of bleed is undesirable.

After at least one day to equilibrate at ambient conditions, the 14-day aged samples are evaluated for performance in the following tests:
  "Polyken" Tack
  Shear Hold time at 23° C.
The 14-day aging period should not markedly harm their original performances.

The following examples are given for the purpose of illustrating the present invention. The compositions of the formulations are all in parts by weight, unless otherwise spacified. All of the experimental polymers and the Elvax ® resins are products of E. I. du Pont de Nemours and Co. The tackifying resins and plasticizers used in all of the examples are listed and identified in Table I and Table II, below. All of these formulations, unless otherwise specified, contained 0.2 parts by weight of an antioxidant, which was either butylated hydroxy toluene or "Irganox" 1010, tetrakis [methylene 3-(3', 5'-di-tertiarybutyl 4'-hydroxyphenyl)propionate] methane, available from Ciba-Geigy Corp. These antioxidants, as well as others, could be used interchangeably in these formulations. The performances of the adhesives are based on the previously described tests. The data presented clearly identify the invention and demonstrate its merit over the art described in previous literature and patents.

COMPARATIVE EXAMPLES A-H

The following eight adhesive compositions (summarized in Table III) were based on noncrosslinked copolymers, seven of them contained a single ethylene/vinyl acetate (E/VA) copolymer while the eighth was based on a single ethylene/vinyl acetate/methacrylic acid (E/VA/MAA) terpolymer. The "Piccovar" and "Piccolastic" tackifiers were used in these formulations because they are widely recognized as some of the most effective resins for use in developing good pressure sensitive performance in adhesives based on E/VA copolymers. "Sylvatac" 40 N was included in this series of formulations as an example of another class (an ester of a tall oil rosin) of tackifier. Rosin esters, in general, show merit in tackifying E/VA copolymers. The three polymers in this series contained 39 to 48 weight percent VA.

The adhesive formulations were prepared in approximately 100 gram quantities in new ½ pint unlined paint cans which had their rims cut off flush with the can wall. The cans were heated in a temperature controlled aluminum block containing four holes sized to be a close fit to the cans. The block was controlled at 200° C., giving a melt temperature of 150°–160° C. for the blends in preparation. The blends were stirred during preparation with three bladed propeller agitators powered with air motors working through reduction gears.

In blend preparation the tackifying resins and antioxidant were placed in the cans, melted and brought to blending temperature.

TABLE I

| TACKIFIERS USED IN THE EXAMPLES | |
|---|---|
| Name | Comments |
| "Acintol" R-SH | Tall oil rosin that has been heat treated to reduce its susceptibility to crystallization (Arizona Chemical Co.). |
| "Arizona" DR-24 | A disproportionated tall oil |

TABLE I-continued
TACKIFIERS USED IN THE EXAMPLES

| Name | Comments |
|---|---|
| | rosin (Arizona Chemical Co.) |
| "Piccolastic" E50 | A low molecular weight modified styrene polymer, softening point 50° C. (Hercules, Inc.). |
| "Piccovar" L30S | Cyclopentadiene-aromatic hydrocarbon based resins softening at 30° and 60° C. (Hercules Inc.). |
| "Piccovar" L60 | |
| "Poly-Pale" Resin | Mildly polymerized rosin (Hercules, Inc.). |
| "Staybelite" Resin | Hydrogenated wood rosin (Hercules, Inc.). |
| "Sylvatac" 40N | Esters made by reacting tall oil rosin with glycerol and/or other polyhydric alcohols (Sylvachem Corp.). |
| "Sylvatac" 60N | |
| "Sylvatac" 80N | |
| "Zonester" 100 | Ester made from tall oil rosin and pentaerythritol (Arizona Chemical Company). |

TABLE II
PLASTICIZERS USED IN THE EXAMPLES

| Name | Comments |
|---|---|
| "Admex" 529 | A medium molecular weight polyester of undisclosed composition (Ashland Chemicals Co.). |
| Ditridecyl phthlate | "Nuoplaz" DTDP (Tenneco). |
| Diisodecyl phthalate | USS Chemical. |
| "Santicizer" 429 | A glycol-dibasic acid polyester of medium-high molecular weight (Monsanto Industrial Chemical Co., a Division of Monsanto Co.). |
| "Wingtack" 10 | A liquid hydrocarbon resin identified as synthetic polyterpene by its manufacturer (Goodyear Chemicals). |
| "Circosol" 4240 | Naphthenic processing oil (Sun Oil Company). |
| "Sundex" 790 | Aromatic processing oil (Sun Oil Company). |
| "Shellflex" 371 | Paraffinic processing oil (Shell Oil Company). |
| "Tufflo" 491 | Aromatic processing oil (Arco). |

TABLE III

| | Comparative Example | | | | | | | |
|---|---|---|---|---|---|---|---|---|
| | A | B | C | D | E | F | G | H |
| Elvax ® 40[1] | 40 | 50 | 50 | 50 | 50 | 40 | — | — |
| Experimental Polymer I[1] | — | — | — | — | — | — | — | 35 |
| Experimental Polymer II[1] | — | — | — | — | — | — | 50 | — |
| "Piccovar" L60 | 60 | 50 | 25 | — | — | — | 50 | — |
| "Piccovar" L30S | — | — | 25 | 50 | — | — | — | 65 |
| "Sylvatac" 40N | — | — | — | — | 50 | — | — | — |
| "Piccolastic" E50 | — | — | — | — | — | 60 | — | — |
| Blend Viscosity, Pa·s at 149° C. | 16 | 36 | 29 | 23 | 31 | 29 | 18 | <10 |

[1]

| Polymer | Mildly Crosslinked | Comonomer, Wt % | | |
|---|---|---|---|---|
| | | VA | MAA | MI |
| Elvax ® 40 | No | 40 | — | 57 |
| Experimental Polymer I | No | 39 | 1.4 | 51 |
| Experimental Polymer II | No | 48 | — | 130 |

Agitation was started as soon as the tackifiers were melted. The polymer pellets were sprinkled into the agitated mixture during a one to two minute period after the melt was at approximately 150° C. Blending was complete in less than a two-hour period after adding the polymer. After the blends were finished their viscosities were measured with an RVT Brookfield viscometer using a Brookfield "Thermosel" to contain the adhesive sample and maintain it at the test temperature of 149° C. (300° F.).

The blends were coated at 0.001 to 0.0015 inches (0.0025 to 0.0037 cm) thickness onto "Kromekote" label paper using the mechanized laboratory coater described earlier. Samples of the adhesive coated label paper were subjected to the various tests described earlier. Their performances in tests run at room temperature (23°±3° C.) are summarized in Table IV. The data indicate that some of these adhesives, especially Comparative Examples A and B, based on "Piccovar" L60 tackifier, show good general pressure sensitive adhesive performances at room temperature.

However, in the 14-day aging tests at 60° C. all eight of these adhesives were very poor. These results are summarized in Table V. As mentioned in the section on test procedures, bleeding to the extent that any recognizable pin point sized spots of adhesive penetrate to the surface of the label paper in 14 days is rated as "trace" bleed and is undesirable. All eight of these compositions on label paper were aged 14 days at 60° C. on release paper. All showed completely unacceptable levels of bleed. The six adhesives that were tested on corrugated board bled so severely into the label stock and into the corrugated board that the labels fell off the corrugated board. Since the bleed and adhesion performance of the eight comparative examples in the important 14-day aging test at 60° C. were so poor these eight formulations have to be rated as having little, if any, practical utility.

TABLE IV

| | COMPARATIVE EXAMPLE | | | | | | | |
|---|---|---|---|---|---|---|---|---|
| | A | B | C | D | E | F | G | H |
| "Polyken" Tack, g | 500 | 370 | 220 | 240 | 220 | 240 | 400 | 730 |
| Rolling Ball Tack, cm | 22 | 19 | 17 | 9 | 13 | NR | 28 | NR |
| Shear Adhesion Time, Minutes | 150 | 710 | 200 | 110 | 300 | 240 | 6 | 1 |
| Peel, 180° Angle, g/cm | 770 | 690 | 760 | 670 | 680 | 270 | 680 | 1250 |
| Glass Mandrel Adhesion, Total lift, mm | 3 | 12 | 24 | 24 | 24 | NR | 12 | NR |

NR = Not Run

TABLE V

| | COMPARATIVE EXAMPLE | | | |
|---|---|---|---|---|
| | A | B | C | D |
| Adhesion to Corrugated Board, % | 0 | 0 | 0 | 0 |
| Bleed when on Corrugated Board | Severe | Severe | Severe | Severe |
| Bleed when Stored on Release Paper | Severe | Severe | Severe | Severe |
| | E | F | G | H |
| Adhesion to Corrugated Board, % | 0 | NR | 0 | NR |
| Bleed when on Corrugated Board | Severe | NR | Severe | NR |

TABLE V-continued

| Bleed when Stored on Release Paper | Severe | Medium | Severe | Severe |
|---|---|---|---|---|

NR = Not Run

COMPARATIVE EXAMPLES I-K AND EXAMPLES 1-4

When two or more E/VA copolymers are used in the same adhesive formulation, satisfactory pressure sensitive performance and satisfactory 60° C. bleed and adhesion performance can be obtained if the following requirements are met:

1. One of the copolymers is relatively high in VA content (30–44 wt % VA) and contributes to tack and adhesion performance.

2. One of the copolymers is relatively low in VA content (10–33 wt % VA) and relatively low in MI (1 to 100 MI) and gives strength to the adhesive.

3. The difference in VA content between the two copolymers should be at least 5 wt %.

4. At least one and preferably both of the copolymers are mildly crosslinked (but still soluble in the adhesive composition) so as to contribute viscosity and melt strength to the adhesive while permitting a relatively low total polymer content in the adhesive. This allows the tackifier composition and content to be adjusted so as to maximize pressure sensitive adhesive performance without contributing to failure in the 60° C. bleed test.

5. The viscosity of the adhesive composition should, in general, be above a minimum level of approximately .15 to 20 Pa·s at 149° C. (300° F.). Viscosity is controlled by the original copolymer MI, the depth of crosslinking of the copolymers, the concentration of the polymers in the blend and the viscosity and concentration of the other ingredients in the blend.

6. The tackifiers and plasticizers (if used) are selected on the basis of adhesive performance and compatibility in the total adhesive system.

Mild crosslinking of the copolymers can be accomplished by any of the well recognized methods, such as exposure to high energy radiation, treatment with free radicals generated by suitable peroxide decomposition, exposure to high shear thermal energy, etc.

Satisfactory adhesion and bleed performance cannot be obtained when using a single E/VA copolymer, even if it is mildly crosslinked, or when using two or more E/VA copolymers of different VA contents if none of them are mildly crosslinked. These performances are illustrated in the examples given in Tables VI and VII. The composition of three comparative adhesives and four adhesives which illustrate the present invention are given in Table VI. These adhesives were prepared and coated onto "Kromekote" label paper as described for comparative Examples A through H.

Samples of the adhesive coated label paper were subjected to the various tests described earlier. Their performances are summarized in Table VII. Comparative Examples I and J were based on single crosslinked E/VA copolymers containing 33 and 40 wt% VA respectively. They exhibited fair to good adhesion performance at room temperature. However, in spite of the fact that both adhesives were of high viscosity (40 and 116 Pa·s, respectively) and Example J was based on a 60° C. softening point resin, both of these adhesive systems showed severe bleed in the 14-day aging test at 60° C. These compositions are not satisfactory for practical use as pressure sensitive adhesives. Comparative Example K was based on two noncrosslinked copolymers, one containing 18 wt% and the other 40 wt% VA. This adhesive gave satisfactory pressure sensitive performance in three tests at room temperature but failed in the 60° C. aging tests, showing severe bleeding into the Kromekote label paper. Comparative Example K formulation is not an acceptable adhesive.

Examples 1 through 4 were each based on two copolymers, one containing 40 wt% VA and the other 28 wt% VA.

TABLE VI

| | COMPARATIVE EXAMPLE | | |
|---|---|---|---|
| | I | J | K |
| Experimental Polymer III[1] | 30 | — | — |
| Experimental Polymer IV[1] | — | 40 | — |
| Experimental Polymer V[1] | — | — | — |
| Experimental Polymer VI[1] | — | — | — |
| Experimental Polymer VII[1] | — | — | — |
| Elvax ® 40 | — | — | 18 |
| Elvax ® 460 | — | — | 18 |
| "Piccovar" L30S | 70 | — | 32 |
| "Piccovar" L60 | — | 60 | 32 |
| Blend Viscosity, Pa·s at 149 C. | 40 | 116 | 25 |

| | Example | | | |
|---|---|---|---|---|
| | 1 | 2 | 3 | 4 |
| Experimental Polymer III[1] | — | — | — | — |
| Experimental Polymer IV[1] | — | 20 | 10 | — |
| Experimental Polymer V[1] | 20 | — | — | — |
| Experimental Polymer VI[1] | — | — | — | 20 |
| Experimental Polymer VII[1] | 10 | 10 | 20 | 10 |
| Elvax ® 40 | — | — | — | — |
| Elvax ® 460 | — | — | — | — |
| "Piccovar" L30S | 35 | 35 | 35 | 35 |
| "Piccovar" L60 | 35 | 35 | 35 | 35 |
| Blend Viscosity, Pa·s at 149 C. | 24 | 38 | 70 | 53 |

| (1) | Mildly Cross-linked[2] | MI | | VA |
|---|---|---|---|---|
| | | From | To | Wt % |
| Experimental Polymer III | Yes | 13 | 0.8 | 33 |
| Experimental Polymer IV | Yes | 57 | 3 | 40 |
| Experimental Polymer V | Yes | 57 | 9 | 40 |
| Experimental Polymer VI | Yes | 57 | 0.25 | 40 |
| Experimental Polymer VII | Yes | 6 | 0.15 | 28 |
| Elvax ® 460 | No | 2.5 | — | 18 |

[2]By electron beam radiation

Both of the copolymers in each of these adhesives had been mildly crosslinked by electron beam radiation. All four of these formulations gave good pressure sensitive adhesive performance in the three tests run at room temperature. All four showed excellent performance in the 14-day 60° C. bleed test. These four compositions have potential practical value because they are effective adhesives at room temperature and do not exhibit any tendency to bleed into label paper when evaluated in the widely recognized 14-day, 60° C. aging test.

Thus comparative Examples A through H showed that pressure sensitive adhesives based on single, noncrosslinked E/VA copolymers containing 39 to 48 wt% VA failed the 60° C. bleed test. Comparative Examples I and J showed that failure in the bleed test was also encountered when biasing pressure sensitive adhesives on single E/VA polymers which had been mildly crosslinked to lower their MI. Comparative Example K showed that the use of one high VA polymer and one lower VA content polymer, neither one crosslinked, in a pressure sensitive adhesive formulation did not solve the bleeding problem. Examples 1 through 4 illustrate the novel and unexpected performances of the adhesive system of the present invention. They demonstrate that two E/VA copolymers of different VA contents (e.g., 28 and 40 wt% VA), both crosslinked mildly, can be used to formulate pressure sensitive adhesives which exhibit satisfactory performances in room temperature adhesion tests and also resist bleeding when aged at 60° C. This could not have been predicted from the performances shown by comparative Examples A through K, particularly when noting that a number of the comparative Examples failing the bleed tests had viscosities considerably higher than those of Examples 1 through 4 which passed the bleed test.

TABLE VII

|  | COMPARATIVE EXAMPLE | | |
|---|---|---|---|
|  | I | J | K |
| "polyken" Tack, g | 430 | 420 | 700 |
| Rolling Ball Tack, cm | NR | 50+ | NR |
| Shear Adhesion Time, Minutes | 22 | 920 | 200 |
| Peel, 180 Angle, g/cm | 430 | 630 | >600 |
| Glass Mandrel Adhesion, Total lift, mm | NR | 5 | NR |
| 60 C., 14-Day Tests |  |  |  |
| Adhesion to Corrugated Board, % | NR | 100 | NR |
| Bleed When on Corrugated Board | NR | Severe | NR |
| Bleed When on Release Paper | Severe | Severe | Severe |

|  | Example | | |
|---|---|---|---|
|  | 2 | 3 | 4 |
| "Polyken" Tack, g | 790 | 900 | 650 | 810 |
| Rolling Ball Tack, cm | NR | NR | NR | NR |
| Shear Adhesion Time, Minutes | 200 | 280 | 890 | 430 |
| Peel, 180 Angle, g/cm | 860 | 820 | 1020 | 660 |
| Glass Mandrel Adhesion, Total lift, mm | NR | NR | NR | NR |
| 60 C., 14-Day Tests |  |  |  |  |
| Adhesion to Corrugated Board, % | 100 | 100 | NR | 100 |
| Bleed When on Corrugated Board | None | None | NR | None |
| Bleed When on Release Paper | None | None | None | None |

NR = Not Run

COMPARATIVE EXAMPLE L and EXAMPLES 5–8

Pressure sensitive adhesives with acceptable performance at room temperature and without bleed in tests at 60° C. also can be prepared from two E/VA copolymers of different VA contents—as discussed in reference to Examples 1–4 when only one of the two copolymers is mildly crosslinked. These performances are demonstrated in Examples 5–8. Comparative Example L shows that severe bleed is encountered when the copolymer with the higher VA content is over 44 wt%, even though it is used with a crosslinked copolymer of 28 wt% VA and the blend has a rather high viscosity. The compositions and viscosities of these formulations are given in Table VIII. These five adhesives were prepared and coated onto "Kromekote" label paper as described for comparative Examples A through H. Samples of the adhesive coated label paper were subjected to the various tests described earlier. Their performances are summarized in Table IX. Comparative Example L was based on a crosslinked 28 wt% VA copolymer and a noncrosslinked 48 wt% VA copolymer. Even though it was quite high in viscosity (59 Pa.s), it showed severe bleed in ten-day aging tests at 60° C. Our studies indicate that adhesives based on two or more copolymers, some of them crosslinked, will bleed in this aging test if one of the major copolymer components contains more than about 44 wt% VA. Thus comparative Example L showed severe bleeding while Example 7 containing less copolymer and possessing one fourth the viscosity of L did not bleed. Both of these adhesives contained a high melt index copolymer component but Example 7 contained copolymers at 40 and 18 wt% VA while comparative Example L contained copolymer at 48 and 28 wt% VA.

TABLE VIII

|  | Comparative Example | Example | | | |
|---|---|---|---|---|---|
|  | L | 5 | 6 | 7 | 8 |
| Experimental Polymer II | 35 | — | — | — | — |
| Experimental Polymer IV | — | 15 | 15 | 18 | — |
| Experimental Polymer VII | 15 | — | — | — | 10 |
| Elvax ® 40 | — | — | — | — | 20 |
| Elvax ® 265[1] | — | 20 | — | — | — |
| Elvax ® 4355[1] | — | — | 20 | — | — |
| Elvax ® 420[1] | — | — | — | 18 | — |
| "Piccovar" L30S | 35 | 40 | 40 | 32 | 35 |
| "Piccovar" L60 | 35 | 25 | 25 | 32 | 35 |
| Blend Viscosity, Pa.s at 149° C. | 59 | 46 | 36 | 14 | 12 |

| [1] Polymer | Mildly Crosslinked[2] | MI From | To | VA Wt % | MAA Wt % |
|---|---|---|---|---|---|
| Elvax ® 265 | No | 3 | — | 28 | — |
| Elvax ® 4355 | No | 6 | — | 25 | 1 |
| Elvax ® 420 | No | 150 | — | 18 | — |

[2] By electron beam radiation

Examples 5, 6 and 7 all contained 15 to 18 wt% of crosslinked copolymer at 40% VA combined with noncrosslinked second copolymers at 18 to 28% VA, one of the latter also contained an additional low concentration of methacrylic acid. None of these formulations showed bleeding tendency in the ten-day test at 60° C. (the test was not run for the usual 14-day period).

Example 8 based on crosslinked 28% VA copolymer and noncrosslinked 40% VA copolymer showed good adhesion properties but developed a trace to a slight bleed in the 60° C. aging test. It was very low in viscosity. The low level of bleed in this formulation could be eliminated by going to a slightly higher total copolymer content or to a higher percentage of "Piccovar" L60 in the tackifier portion of the formulation.

TABLE IX

|  | Comparative Example | Examples | | | |
|---|---|---|---|---|---|
|  | L | 5 | 6 | 7 | 8 |
| "Polyken" Tack, g | 300 | 580 | 520 | 560 | 910 |
| Rolling Ball Tack, cm | 32 | NR | NR | NR | NR |
| Shear Adhesion Time, Min. | 60 | 220 | 290 | 1440+ | 250 |
| Peel, 180° Angle, g/cm | 610 | >600 | 790 | >600 | 850 |
| Glass Mandrel Adhesion, Total lift, mm | 6 | NR | NR | NR | NR |
| 60° C., 10-Day Aging Tests |  |  |  |  |  |
| Adhesion to Corrugated, % | 100 | NR | NR | NR | NR |
| Bleed when on Corrugated Board | Medium | NR | NR | NR | NR |
| Bleed when on |  |  |  |  |  |

TABLE IX-continued

| | Comparative Example | Examples | | | |
|---|---|---|---|---|---|
| | L | 5 | 6 | 7 | 8 |
| Release Paper | Severe | None | None | None | Trace to slight |

NR = Not Run

EXAMPLES 9-13

In some cases it is desired to improve certain adhesive characteristics of the present formulations. This can be done by use of relatively low concentrations of liquid or semi-liquid plasticizers along with the tackifier system. These improvements are sometimes difficult to evaluate in simple laboratory tests and involve things such as finger tack, adhesion to certain substrates, improvement in the die cutting of labels and of the ability of die cut labels to run in automatic labeling machines, etc.

A variety of these plasticizers have been tested in formulations of the present invention. Compositions of some of these formulations are given in Table X.

These five adhesives were prepared and coated onto "Kromekote" label paper as described for comparative Examples A through H. Samples of the adhesive coated label paper were subjected to the various tests described earlier. Their performances are summarized in Table XI. The five formulations showed good adhesive performances in the room temperature tests. Four of the five adhesives passed the 14-day aging test without bleeding into the label paper. The fifth adhesive showed a trace of bleed in this test. The plasicizer used in that formulation was the lowest in viscosity and molecular weight of the five tested, indicating that some care must be exercised in matching the plasticizer with the formulation in respect to bleed performance as well as adhesive performance.

The test samples which had been aged on release paper a 60° C. still gave acceptable performance in the "Polyken" Tack test and in the shear adhesion test.

TABLE X

| | Example | | | | |
|---|---|---|---|---|---|
| | 9 | 10 | 11 | 12 | 13 |
| Experimental Polymer IV | 20 | 20 | 20 | 20 | 20.5 |
| Experimental Polymer VII | 10 | 10 | 10 | 10 | 15.5 |
| "Piccovar" L30S | 32 | 32 | 32 | 32 | 27 |
| "Piccovar" L60 | 35 | 35 | 35 | 35 | 27 |
| Plasticizer | | | | | |
| ditridecyl phthalate | 3 | — | — | — | — |
| diisodecyl phthalate | — | 3 | — | — | — |
| "Santicizer" 429 | — | — | 3 | — | — |
| "Admex 529" | — | — | — | 3 | — |
| "Wingtack" 10 | — | — | — | — | 3 |
| Blend Viscosity, Pa.s at 149° C. | 37 | 38 | 42 | 43 | 105 |

TABLE XI

| | 9 | 10 | 11 | 12 | 13 |
|---|---|---|---|---|---|
| "Polyken" Tack, g | 520 | 650 | 590 | 680 | 580 |
| Rolling Ball Tack, cm | 30 | NR | NR | NR | NR |
| Shear Adhesion Time, Min. | 270 | 330 | 210 | 200 | 330 |
| Peel, 180° Angle, g/cm | >600 | >600 | >600 | >600 | >600 |
| Glass Mandrel Adhesion, Total lift, mm | 6 | 5 | 5 | 6 | 22 |
| 60° C., 14-Day Aging Tests | | | | | |
| Adhesion to Corrugated, &% | 100 | 100 | 100 | 100 | 100 |
| Bleed when on Corrugated Board | None | Trace | None | None | None |
| Bleed when on Release Paper | None | Trace | None | None | None |
| "Polyken" Tack on Aged Labels, g | 460 | 420 | 230 | 420 | 360 |
| Shear Adhesion on Aged Labels, Minutes | 360 | 490 | 450 | 760 | 350 |

NR = Not Run

COMPARATIVE EXAMPLES M and N and EXAMPLES 14 and 15

It might be thought that instead of blending two crosslinked E/VA copolymers of different VA contents together to attain good pressure sensitive adhesive properties combined with nonbleeding performance in the 60° C. aging test, it would be possible to achieve the same result using a single crosslinked copolymer of intermediate VA content. That this is not the case, is illustrated in the performances of the following four blends. Experimental Polymer III contains 33 wt% VA. It has been mildly crosslinked by electron beam radiation from an original MI of 13 down to 0.8 MI. Thirty parts of Experimental Polymer III can be matched at 33 wt% average VA content by blending 13 parts of (crosslinked) Experimental Polymer IV (40 wt% VA) with 17 parts of (crosslinked) Experimental Polymer VII (28 wt% VA). Duplicate formulations were made comparing adhesives based on 30 parts of Polymer III to adhesives based on 13 parts of Polymer IV plus 17 parts of Polymer VII. Compositions of these formulations are given in Table XII.

These four adhesives were prepared and coated onto "Kromekote" label paper as described for comparative Examples A-H. Samples of the adhesive coated label paper were subjected to the various tests described earlier. Their performances are summarized in Table XIII. The two pairs showed fair to good adhesion in the room temperature tests and there was not much difference between the two adhesives in these basic tests. However, when evaluated in the 14-day aging test at 60° C. the adhesives (M and N) based on the single crosslinked 33 wt% VA copolymer failed the bleed test badly, showing medium to severe bleeding into the label paper. On the other hand, the adhesive based on the blend of high and low VA content copolymers did not show any bleed in this test. This result again clearly demonstrates the unique and desirable features of the copolymer blends of this invention.

TABLE XII

| | Comparative Example | | Example | |
|---|---|---|---|---|
| | M | N[1] | 14 | 15[1] |
| Experimental Polymer III | 30 | 30 | — | — |
| Experimental Polymer IV | — | — | 13 | 13 |
| Experimental Polymer VII | — | — | 17 | 17 |
| "Piccovar" L30S | 31 | 31 | 31 | 31 |
| "Piccovar" L60 | 35 | 35 | 35 | 35 |
| Ditridecyl phthalate | 4 | 4 | 4 | 4 |
| Blend Viscosity, | | | | |

TABLE XII-continued

|  | Comparative Example | | Example | |
|---|---|---|---|---|
|  | M | N[1] | 14 | 15[1] |
| Pa . s at 149° C. | 50 | 52 | 56 | 60 |

[1]Prepared and tested seven months after the preceding example

TABLE XIII

|  | Comparative Example | | Example | |
|---|---|---|---|---|
|  | M | N | 14 | 15 |
| "Polyken" Tack, g | 500 | 370 | 640 | 430 |
| Rolling Ball Tack, cm | NR | 50+ | NR | 50+ |
| Shear Adhesion Time, Min. | 180 | 10 | 130 | 170 |
| Peel, 180° Angle, g/cm | >600 | 770 | >600 | 650 |
| Glass Mandrel Adhesion Total lift, mm | 24 | 24 | 24 | 22 |
| 60° C., 14-Day Aging Tests |  |  |  |  |
| Adhesion to Corrugated, % | 100 | 100 | 100 | 100 |
| Bleed when on Corrugated Board | Severe | Medium | None | None |
| Bleed when on Release Paper | Medium | Medium | None | None |
| "Polyken" Tack on Aged Labels, g | NR | NR | 460 | NR |
| Shear Adhesion on Aged Labels, Minutes | NR | NR | 240 | NR |

NR = Not Run

EXAMPLES 16–19

The first 15 Examples all used "Piccovar" L30S and "Piccovar" L60 as the tackifiers to give pressure sensitive performance to the E/VA copolymers. Rosins and rosin esters, as well as their blends with "Piccovar" resins, also may be used for this purpose. Examples 16–19 cover adhesive compositions based on the rosin tackifying systems. The formulations and their viscosities are given in Table XIV.

These four adhesives were prepared and coated onto "Kromekote" label paper as described for Comparative Examples A–H. Samples of the adhesive coated label paper were subjected to the various tests described earlier. Their performances are summarized in Table XV. The room temperature adhesive performances of these adhesives in these basic tests were, in general, good, especially in the glass mandrel test. In the 60° C. aging test all four showed good bonds to the corrugated board and earned a "no bleed" rating both on corrugated board and on release paper. Comparative Example E (Elvax® 40/"Sylvatac" 40N) showed severe bleeding. Thus Example 16 demonstrates the merit of adhesives based on two crosslinked E/VA copolymers compared to adhesives based on a single noncrosslinked copolymer.

TABLE XIV

|  | Example | | | |
|---|---|---|---|---|
|  | 16 | 17 | 18 | 19 |
| Experimental Polymer IV | 20 | 20 | 20 | 20 |
| Experimental Polymer VII | 10 | 10 | 10 | 10 |
| "Sylvatac" 40 N | 64 | — | — | — |
| "Sylvatac" 60 N | — | 64 | 35 | — |
| "Staybelite" Resin | — | — | — | 30 |
| "Poly Pale" Resin | — | — | — | 5 |
| "Piccovar" L 30S | — | — | 32 | 32 |
| Ditridecyl Phthalate | 6 | 6 | 3 | 3 |
| Blend Viscosity, Pa . s at 149° C. | 40 | 66 | 53 | 41 |

TABLE XV

|  | Example | | | |
|---|---|---|---|---|
|  | 16 | 17 | 18 | 19 |
| "Polyken" Tack, g | 590 | 310 | 400 | 340 |
| Rolling Ball Tack, cm | 47 | 50+ | 50+ | 50+ |
| Shear Adhesion Time, Min. | 70 | 1010 | 650 | 330 |
| Peel, 180° Angle, g/cm | 710 | 720 | 550 | 570 |
| Glass Mandrel Adhesion, Total lift, mm | 2 | 1 | 1 | 1 |
| 60° C., 14-Day Aging Tests |  |  |  |  |
| Adhesion to Corrugated, % | 100 | 100 | 100 | 100 |
| Bleed when on Corrugated Board | None | None | None | None |
| Bleed when on Release Paper | None | None | None | None |
| "Polyken" Tack on Aged Labels, g | 0 | 5 | 200 | 130 |
| Shear Adhesion on Aged Labels, Minutes | — | 1440+ | 510 | 850 |

EXAMPLES 20–22

In some cases it is desirable to add inert fillers to a pressure sensitive adhesive formulation. Fillers can be used to increase blend viscosity, decrease bleed tendency, decrease the cost of the adhesive, render it opaque, etc. Examples 20–22 illustrate the use of mica and "Snow Flake" Whiting (calcium carbonate) as fillers in E/VA copolymer based pressure sensitive adhesives. Their compositions and viscosities are given in Table XVI.

The four adhesives were prepared and coated onto "Kromekote" label paper as described for Comparative Examples A–H. Samples of the adhesive coated label paper were subjected to the various tests described earlier. Their performances are summarized in Table XVII. The three filled adhesives did not differ significantly from the satisfactory performance of the control adhesive of the present invention (Example 9) which is included in the table as the non-filled reference blend. None of these blends based on two crosslinked E/VA copolymers of different VA contents, showed bleed in the 14-day aging tests at 60° C.

TABLE XVI

|  | Example | | | |
|---|---|---|---|---|
|  | 9 | 20 | 21 | 22 |
| Experimental Polymer IV | 20 | 20 | 20 | 20 |
| Experimental Polymer VII | 10 | 10 | 10 | 10 |
| "Piccovar" L30S | 32 | 32 | 32 | 32 |
| "Piccovar" L60 | 35 | 35 | 35 | 35 |
| Ditridecyl Phthalate | 3 | 3 | 3 | 3 |
| Mica (325 mesh) | — | 5 | — | — |
| "Snow Flake" Whiting | — | — | 5 | 10 |
| Blend Viscosity, Pa . s at 149° C. | 37 | 45 | 43 | 46 |

TABLE XVII

| | Example | | | |
|---|---|---|---|---|
| | 9 | 20 | 21 | 22 |
| "Polyken" Tack, g | 520 | 450 | 630 | 480 |
| Rolling Ball Tack, cm | 30 | — | — | 25 |
| Shear Adhesion Time, Min. | 270 | 200 | 390 | 120 |
| Peel, 180° Angle g/cm | >600 | >600 | >600 | >600 |
| Glass Mandrel Adhesion, Total lift, mm | 6 | 10 | 6 | 22 |
| 60° C., 14-Day Aging Tests | | | | |
| Adhesion to Corrugated, % | 100 | 100 | 100 | 100 |
| Bleed on Corrugated Board | None | None | None | None |
| Bleed on Release Paper | None | None | None | None |
| "Polyken" Tack on Aged Labels, g | 480 | NR | NR | 480 |
| Shear Adhesion on Aged Labels, Minutes | 360 | NR | NR | 420 |

NR = Not Run

EXAMPLES 23–30

The previous examples of pressure sensitive adhesive formulations giving good performance at room temperature and showing the necessary resistance to bleeding in the 14-day aging test at 60° C. have been based on blends of at least two E/VA copolymers with different VA contents. In many of these examples both of the copolymers in the formulation have been individually crosslinked. When an individual copolymer is crosslinked, the crosslinked product primarily consists of some unchanged original copolymer molecules and some new ones which are the reaction products of original molecules and fragments of original copolymer molecules formed in the crosslinking process. These new molecules are higher in molecular weight than the original ones. Thus the mildly crosslinked product has a significantly higher average molecular weight than that of the original copolymer.

In adhesives containing two different, individually crosslinked copolymers, copolymer "A" and copolymer "B", the adhesive composition contains:

"A" copolymer molecules+"A" copolymer molecules coupled to "A" copolymer fragments and
"B" copolymer molecules+"B" copolymer molecules coupled to "B" copolymer fragments.

These copolymers are dissolved in, and homogeneously mixed with, the other components of the adhesive during the blending process—which could be done molten (at elevated temperature), in solvents, or even in aqueous dispersions.

A second, and more desirable, way to obtain the copolymer system for these pressure sensitive adhesives is to first melt blend the two individual copolymers of different VA contents via an extruder or other effective high shear mixing system and then to mildly crosslink the resulting blend. When this homogeneous mixture of the two copolymers is crosslinked not only does "A" copolymer react with fragments of "A" copolymer and "B" copolymer react with fragments of "B" copolymer, but "A" copolymer also reacts with fragments of "B" copolymer and "B" copolymer also reacts with fragments of "A" copolymer. This cross bonding of the two different polymers, or their fragments, gives true "blocky" structure to a portion of the copolymer blend. This leads to increasing the compatibility of the two copolymers with each other and also in changing their compatibility with the tackifiers, plasticizers and other components of the adhesives in which they are used.

A wide variety of melt blends of two copolymers with different VA contents have been prepared in suitable single and twin screw extruders, radiation crosslinked to lower their MI and tested for performance in pressure sensitive adhesive formulations. Table XVIII lists copolymer blends prepared and indicates some of the lowest MI levels prepared by radiation crosslinking and evaluated in pressure sensitive adhesive formulations.

It was readily apparent that crosslinking a melt blend did generate bonding between the two types of copolymer in the blend. For example, a melt blend based on 40 and 28 weight percent VA copolymer at a 2/1 weight ratio of the two copolymers was radiation crosslinked from 30 down to 1.1 and also to 0.7 MI. Molded slabs (10×10×0.15 cm) were prepared from the noncrosslinked melt blend and from the two crosslinked products. Because of not complete compatability between the 40 and 28 weight percent VA copolymers the slab made from the original blend was translucent.

TABLE XVIII

| | Melt Blend of: | | | | | Blend MI | |
|---|---|---|---|---|---|---|---|
| | Copolymer A | | Copolymer B | | Wt | | |
| Ex. | VA Wt % | VA MI | Wt % | Ratio MI | A/B | After Original | Radiation |
| 23 | 40 | 57 | 18 | 500 | ½ | 280 | 5 |
| 24 | 40 | 57 | 18 | 500 | 2/1 | 110 | 5 |
| 25 | 40 | 57 | 10 | 280 | ½ | 170 | 10 |
| 26 | 40 | 57 | 10 | 280 | 2/1 | 90 | 3 |
| 27 | 40 | 57 | 18 | 2.5 | 5/1 | 40 | 0.4 |
| 28 | 40 | 57 | 18 | 2.5 | 4/1 | 31 | 0.4 |
| 29 | 40 | 57 | 28 | 6 | 5/1 | 44 | (0.6) |
| 30 | 40 | 57 | 28 | 6 | 2/1 | 30 | 0.3 |

| | Tensile[1][2] Strength MPa | Elongation[2] At Break, % | Elastic[3] Modulus MPa | Shore[4] Hardness |
|---|---|---|---|---|
| Elvax ® 40 (40 wt.% VA) | | | | |
| as is, 57 MI | 4.8 | 1400 | 2.1 | 48 |
| Elvax ® 260 (28 wt.% VA) | | | | |
| as is, 6MI | 19.3 | 1200 | 10.4 | 80 |
| crosslinked to | | | | |
| 0.15 MI | 21.0 | 1400 | 10.0 | 80 |
| Elvax ® 40/Elvax ® 260 (2/1) | | | | |
| as is, 30 MI | 5.1 | 1250 | 2.1 | 58 |
| crosslinked to | | | | |
| 1.1 MI | 9.7 | 1340 | 2.2 | 62 |
| crosslinked to | | | | |
| 0.7 MI | 11.4 | 1460 | 2.6 | 63 |

[1]6.9 MPa = 1000 psi.
[2]Dumbbell gauge dimensions 2.23 × 0.48 × 0.13 cm, crosshead speed 5.1 cm/minute (ASTM D 1708).
[3]Modulus calculated as in ASTM D 638.
[4]A-2 Durometer, 10 seconds (ASTM D 2240).

slabs prepared from the crosslinked products were hazy transparent and much clearer than those from the original blend. This indicated that the crosslinking process had increased the compatibility beteen the 28 and 40 weight percent VA copolymers. This increase in compatibility must have been caused by some cross bonding between the two copolymers.

Further, tensile strength measurements were made, using an "Instron" Tester, on dumbbells die cut from these pressed slabs. The data are summarized in Table XIX. They indicate that whereas the tensile properties of the original blend were essentially those of the 40 weight percent VA component of the blend, those of the crosslinked blends were much closer to the properties of the 28 weight percent VA component of the blend. This again suggests some crosslinking between the two components of the blend and mutual compatibilization of the two copolymers.

EXAMPLES 31-35

Five of the melt blended and subsequently crosslinked copolymer systems listed in Table XVIII were formulated into pressure sensitive adhesives as summarized in Table XX.

The five copolymer systems were all based on a 40 weight percent VA copolymer blended with various lower VA content copolymers, these latter contained 10, 18 and 28 weight percent VA. These five adhesives were prepared and coated onto "Kromekote" label paper as described for Comparative Examples A–H. Samples of the adhesive coated label paper were subjected to the various tests described earlier. Their performances are summarized in Table XXI. All five adhesives gave good performance at room temperature and all passed the 14-day aging test at 60° C. showing 100% adhesion to the corrugated board and no bleeding, either on the corrugated board or on release paper. Adhesion performances after the aging test were good.

TABLE XX

| Mildly Crosslinked[1] Copolymer Melt Blend of | Crosslinked Copolymer Blend MI | Example 31 | 32 | 33 | 34 | 35 |
|---|---|---|---|---|---|---|
| Example 26 | 3 | 33 | — | — | — | — |
| Example 27 | 0.4 | — | 30 | — | — | — |
| Example 28 | 0.4 | — | — | 30 | — | — |
| Example 29 | (0.6) | — | — | — | 30 | — |
| Example 30 | 0.3 | — | — | — | — | 30 |
| "Piccovar" L30S | | 33 | 32 | 32 | 32 | 32 |
| "Piccovar" L60 | | 33 | 35 | 35 | 35 | 35 |
| Ditridecyl Phthalate | | — | 3 | 3 | 3 | 3 |
| Blend Viscosity, Pa . s at 149° C. | | 44 | 82 | 93 | 52 | 90 |

[1]By electron beam radiation.

TABLE XXI

| | Example | | | | |
|---|---|---|---|---|---|
| | 31 | 32 | 33 | 34 | 35 |
| "Polyken" Tack, g | 870 | 430 | 410 | 450 | 550 |
| Rolling Ball Tack, cm | NR | 50+ | 50+ | 50+ | 21 |
| Shear Adhesion Time, minutes | 400 | 780 | 430 | 230 | 220 |
| Peel, 180° Angle, g/cm | 960 | >600 | >600 | >600 | 880 |
| Glass Mandrel Adhesion, Total lift, mm | NR | 3 | 2 | 6 | 5 |
| 60° C., 14-Day Aging Tests | | | | | |
| Adhesion to Corrugated, % | NR | 100 | 100 | 100 | 100 |
| Bleed when on Corrugated Board | NR | None | None | None | None |
| Bleed when on Release Paper | None | None | None | None | None |
| "Polyken" Tack on Aged Labels, g | NR | 340 | 330 | 320 | 390 |
| Shear Adhesion on Aged Labels, minutes | NR | 790 | 560 | 690 | 430 |

NR = Not Run

EXAMPLES 36-39

Melt blended copolymers which are then mildly crosslinked may be used in a wide variety of formulations and may be used with noncrosslinked copolymers to prepare pressure sensitive adhesive formulations which meet the requirements of good performance at room temperature as well as the important requirement of 60° C. aging without developing bleeding problems. Table XXII illustrates four such formulations.

These four adhesives were prepared and coated onto "Kromekote" label paper as described for Comparative Examples A-H. Samples of the adhesive coated label paper were subjected to the various tests described earlier. Their performances are summarized in Table XXIII. All four adhesives performed well in the room temperature tests and showed no bleed in the 14-day aging tests at 60° C. This was true even when 25 or 26 parts of the crosslinked melt blend of two copolymers were combined with 10 parts of noncrosslinked copolymer containing either 28 or 40 weight percent VA.

TABLE XXII

| | Example | | | |
|---|---|---|---|---|
| | 36 | 37 | 38 | 39 |
| Experimental Copolymer VIII[1] | 30 | 30 | 26 | 25 |
| Elvax ® 40 | — | — | 10 | — |
| Elvax ® 210[2] | — | — | — | 10 |
| "Piccovar" L30S | 32 | — | 32 | 31 |
| "Piccovar" L60 | 35 | — | — | — |
| "Arizona" DR-24 | — | 70 | 32 | 30 |
| Ditridecyl Phthalate | 3 | — | — | 4 |
| Blend Viscosity Pa . s at 149° C. | 50 | 41 | 46 | 26 |

[1]Melt blend of Example 30 radiation crosslinked from 30 MI to 0.7 MI.
[2]28 weight percent VA, 400 MI.

TABLE XXIII

| | Example | | | |
|---|---|---|---|---|
| | 36 | 37 | 38 | 39 |
| "Polyken" Tack, g | 500 | 540 | 530 | 460 |
| Rolling Ball Tack, cm | 40 | 50+ | 30 | 19 |
| Shear Adhesion Time, minutes | 100 | 420 | 120 | 70 |
| Peel, 180° Angle, g/cm | 840 | 1030 | 860 | 780 |
| Glass Mandrel Adhesion, Total lift, mm | 2 | 1 | 1 | 10 |
| 60° C., 14-Day Aging Test | | | | |
| Adhesion to Corrugated, % | 100 | 100 | 100 | 100 |
| Bleed when on Corrugated Board | None | None | None | None |
| Bleed when on Release paper | None | None | None | None |
| "Polyken" Tack on Aged Labels, g | 520 | 500 | 430 | 360 |
| Shear Adhesion on Aged Labels, minutes | 70 | 450 | 240 | 20 |

COMPARATIVE EXAMPLES O and P and EXAMPLE 40

It appears to be more difficult to formulate satisfactory pressure sensitive adhesives based on ethylene/methyl acrylate (E/MA) copolymers than from E/Va copolymers. Nevertheless, the severe bleed shown by a formulation based on a single noncrosslinked copolymer, or by a single copolymer which is crosslinked, can be eliminated by use of two crosslinked E/MA copolymers of significantly different MA contents in the adhesive formulation. Compositions which illustrate these performances are given in Table XXIV.

These three adhesives were prepared and coated onto "Kromekote" label paper as described for Comparative Examples A–H. Samples of the adhesive coated label paper were subjected to the various tests described earlier. Their performances are summarized in Table XXV. The two Comparative Examples (O and P) based on a single E/MA copolymer containing 32 weight percent MA showed good Polyken tack and shear adhesion but gave completely unacceptable performances in the 60° C., 14-day bleed test. In Comparative Example O the copolymer was non-crosslinked. In Comparative Example P the same copolymer was crosslinked. When the crosslinked copolymer used in Comparative Example P was used with a crosslinked copolymer containing a significantly lower concentration of MA (19 weight percent) "Polyken" Tack and shear adhesion remained satisfactory and bleeding in the 14-day aging test at 60° C. was eliminated (see Example 40). This is a further example of the unexpected benefit of using two crosslinked copolymers of significantly different comonomer contents in pressure sensitive adhesive formulations to greatly reduce or eliminate bleed encountered during aging tests.

TABLE XXIV

|  | Comparative Example | | Example |
|---|---|---|---|
|  | O | P | 40 |
| Experimental Polymer IX[1] | 30 | — | — |
| Experimental Polymer X[1] | — | 30 | 20 |
| Experimental Polymer XI[1] | — | — | 10 |
| "Piccovar" L30S | 35 | 35 | 35 |
| "Sylvatac" RX | 35 | 35 | 35 |
| Blend Viscosity, Pa · s at 149° C. | 22 | 41 | 43 |

| [1]Copolymer | MA Wt % | Mildly Crosslinked[2] | MI From | To |
|---|---|---|---|---|
| Experimental Polymer IX | 32 | No | 6.5 | — |
| Experimental Polymer X | 32 | Yes | 6.5 | 1.3 |
| Experimental Polymer XI | 19 | Yes | 5.0 | 0.7 |

[2]By electron beam radiation

TABLE XXV

|  | Comparative Example | | Example |
|---|---|---|---|
|  | O | P | 40 |
| Polyken Tack, g | 490 | 510 | 500 |
| Rolling Ball Tack, cm | 50+ | 50+ | 50+ |
| Shear Adhesion Time, minutes | 50 | 80 | 70 |
| Peel, 180° Angle, g/cm | 1000 | 1020 | 930 |
| Glass Mandrel Adhesion, Total lift, mm | 24 | 9 | 24 |
| 60° C., 14-Day aging Tests |  |  |  |
| Adhesion to Corrugated, % | 0 | 100 | 100 |
| Bleed when on Corrugated Board | Severe | Medium | None |
| Bleed when on Release Paper | Severe | Medium | None |

EXAMPLES 41–46

A wide variety of petroleum derived processing or extending oils used in rubber compounding and other industrial applications can be used as the plasticizer (or combined with other plasticizers) in pressure sensitive adhesives based on the crosslinked copolymers which are the subject of this invention. Table XXVI identifies four of these processing oils and Table XXVII illustrates the compositions of six pressure sensitive adhesive formulations used to evaluate these four oils.

These adhesives were prepared and coated onto "kromekote" label paper as described for Comparative Examples A–H. Samples of the adhesive coated label paper were subjected to the various tests described earlier. Their performances are summarized in Table XXVIII. All six adhesives performed well in the room temperature tests and, importantly, showed no bleed in the 14 day aging tests at 60° C. This was true even using only 26 weight percent of the crosslinked melt blend of polymers in a formulation containing 15 weight percent of the low viscosity, paraffinic classification, processing oil. This blend had only a 17 Pa·s viscosity at 149° C. (300° F.) and still did not bleed in the 14-day, 60° C. aging test. Processing oils in the aromatic and naphthenic classifications also showed good plasticizer performance, and no bleed in these formulations.

TABLE XXVI

| Oil |  | Visc., 100° F., SUS[1] | SP. GR., 60° F. |
|---|---|---|---|
| "Tufflo" 491 | Aromatic | 7060 | 0.99 |
| "Sundex" 790 | Aromatic | 3500 | 1.00 |
| "Circosol" 4240 | Naphthenic | 2530 | 0.95 |
| "Shellflex" 371 | Paraffinic | 420 | 0.90 |

[1]Saybolt Universal Seconds = 4.632 × viscosity in centistokes (cs)

TABLE XXVII

|  | EXAMPLE | | | | | |
|---|---|---|---|---|---|---|
|  | 41 | 42 | 43 | 44 | 45 | 46 |
| Experimental Copolymer VIII[1] | 30 | 30 | 30 | 26 | 26 | 26 |
| "Arizona" DR-24 | 55 | 55 | 55 | 49 | 49 | 49 |
| "Zonester" 100 | — | — | — | 10 | 10 | 10 |
| "Tufflo" 491 | 15 | — | — | — | — | — |
| "Sundex" 790 | — | — | — | 15 | — | — |
| "Circosol" 4240 | — | 15 | — | — | 15 | — |
| "Shellflex" 371 | — | — | 15 | — | — | 15 |
| Trisnonyl phenyl Phosphite[2] | 1 | 1 | 1 | 1 | 1 | 1 |
| Blend viscosity, Pa · s at 149° C. | 39 | 37 | 30 | 22 | 21 | 17 |

[1]Melt blend of example 30 radiation crosslinked from 30 MI to 0.7 MI.
[2]Antioxidant used in place of BHT or "Irganox" 1010

TABLE XXVIII

|  | EXAMPLE | | | | | |
|---|---|---|---|---|---|---|
|  | 41 | 42 | 43 | 44 | 45 | 46 |
| "Polyken" Tack, g | 460 | 400 | 370 | 460 | 480 | 450 |
| Rolling Ball Tack, cm | 50+ | 50+ | 15 | 50+ | 50+ | 39 |
| Shear Adhesion Time, Minutes | 130 | 80 | 20 | 90 | 80 | 50 |
| Peel, 180° angle, g/cm[1] | 660 | 660 | 520 | 540 | 670 | 700 |
| Glass mandrel adhesion, Total lift, mm | 6 | 6 | 8 | 0 | 0 | 2 |
| 60° C., 14 Day aging test Adhesion to corrugated, % | 100 | 100 | 100 | 100 | 100 | 100 |
| Bleed when on corrugated board | NONE | NONE | NONE | NONE | NONE | NONE |
| Bleed when on release paper | NONE | NONE | NONE | NONE | NONE | NONE |

TABLE XXVIII-continued

| | EXAMPLE | | | | | |
|---|---|---|---|---|---|---|
| | 41 | 42 | 43 | 44 | 45 | 46 |
| "Polyken" Tack on Aged labels, g | 320 | 240 | 260 | 210 | 330 | 230 |
| Shear Adhesion on Aged labels, minutes | 230 | 280 | 120 | 260 | 290 | 70 |

(1) Immediate paper failing bonds

I claim:

1. A composition consisting essentially of a homogeneous blend of at least one non-crosslinked ethylene copolymer (A) and at least one non-crosslinked ethylene copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a polar comonomer content of from about 25 to about 50 percent by weight, an ethylene content of from about 50 to about 75 percent by weight and a melt index of from about 3 to about 200, and copolymer (B) having a polar comonomer content of from about 10 to about 33 percent by weight, an ethylene content of from about 67 to about 90 percent by weight and a melt index of from about 1 to about 100, provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, said homogeneous blend of copolymers (A) and (B) having been mildly crosslinked to reduce the melt index of said blend by a factor of from about 2 to about 150.

2. The composition of claim 1 wherein said polar comonomer is selected from the group consisting of vinyl acetate, methyl acrylate and ethyl acrylate.

3. The composition of claim 2 wherein said polar comonomer is vinyl acetate.

4. A composition consisting essentially of
   (a) from about 14 to about 60 percent by weight of a homogeneous blend of at least one non-crosslinked copolymer (A) and at least one non-crosslinked copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a melt index of from about 3 to about 200 and a minimum polar comonomer content that is sufficient to yield the desired tack in pressure sensitive adhesive formulations and having a maximum polar comonomer content that will still maintain the desired bleed resistance when used in the formulation of this claim, and copolymer (B) having a melt index of from about 1 to about 100, a polar comonomer content of from about 10 to about 33 percent by weight, and an ethylene content of from about 67 to about 90 percent by weight and provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, said homogeneous blend of copolymers (A) and (B) having been mildly crosslinked to reduce the melt index of said blend by a factor of from about 2 to about 150;
   (b) from 0 to about 25 percent by weight of filler;
   (c) from 0 to about 5 percent by weight of antioxidant;
   (d) from about 40 to about 86 percent by weight of tackifier; and
   (e) from 0 to about 25 percent by weight of plasticizer.

5. The composition of claim 4 wherein said polar comonomer is selected from the group consisting of vinyl acetate, methyl acrylate and ethyl acrylate.

6. The composition of claim 5 wherein said polar comonomer is vinyl acetate and wherein the vinyl acetate content of copolymer (A) is from about 30 to about 44 percent by weight.

7. The composition of claim 6 wherein said tackifier is selected from the group consisting of rosin acids derived from wood, gum or tall oil and their hydrogenated, disproportionated, mildly polymerized or ester derivatives; terpene resins; dicyclopentadiene-aromatic hydrocarbon resins; and low molecular weight styrene or substituted styrene resins.

8. The composition of claim 7 wherein said tackifier is selected from the group consisting of dicyclopentadiene-aromatic hydrocarbon resins and rosin acids derived from wood, gum or tall oil and their hydrogenated, disproportionated, mildly polymerized or ester derivatives.

9. The composition of claim 7 wherein said plasticizer is selected from the group consisting of phthalates, azelates, adipates, tricresyl phosphate, polyesters, and low molecular weight alkylated phenol, phenol modified coumarone-indene, terpene and synthetic terpene resins, and processing oils.

10. The composition of claim 9 wherein
   (a) said homogeneous blend of at least one non-crosslinked ethylene copolymer (A) and at least one non-crosslinked ethylene copolymer (B) is present in an amount of from about 20 to about 40 percent by weight, copolymer (A) having a polar comonomer content of from about 38 to about 42 percent by weight, an ethylene content of from about 58 to about 62 percent by weight and a melt index of from about 30 to about 90, copolymer (B) having a polar comonomer content of from about 18 to about 28 percent by weight, an ethylene content of from about 72 to about 82 percent by weight and a melt index of from about 2 to about 25, copolymer(s) (A) being present in an amount of from about 15 to about 85 percent based upon the weight of total copolymer and copolymer(s) (B) being present in an amount of from about 15 to about 85 percent based upon the weight of total copolymer, said homogeneous blend of copolymers (A) and (B) having been mildly cross-linked to reduce the melt index of said blend by a factor of from about 10 to about 100;

(b) said filler is present in an amount of from 0 to about 20 percent by weight;

(c) said antioxidant is present in an amount of from about 0.1 to about 2 percent by weight;

(d) said tackifier is a blend of at least two tackifiers and is present in an amount of from about 50 to about 80 percent by weight; and (e) said plasticizer is present in an amount of from 0 to about 20 percent by weight.

11. A composition consisting essentially of (a) from about 14 to about 60 percent by weight of a mixture of at least one ethylene copolymer (A) and at least one ethylene copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, copolymer (A) having a melt index of from about 3 to about 200 and a minimum polar comonomer content that is sufficient to yield the desired tack in pressure sensitive formulations and having a maximum polar comonomer content that will still maintain the desired bleed resistance when used in the formulation of this claim, and copolymer (B) having a melt index of from about 1 to about 100, a polar comonomer content of from about 10 to about 33 percent by weight, and an ethylene content of from about 67 to about 90 percent by weight; provided that the polar comonomer content of copolymer (A) is at least 5 percent by weight higher than the polar comonomer content of copolymer (B), copolymer(s) (A) being present in an amount of from about 10 to about 90 percent based upon the weight of total copolymer and copolymer(s) (B) being present in an amount of from about 10 to about 90 percent based upon the weight of total copolymer, at least one copolymer of said copolymer(s) (A) and copolymer(s) (B) having been mildly crosslinked to reduce its melt index by a factor of from about 2 to about 200 for copolymer(s) (A) and by a factor of from about 2 to about 100 for copolymer(s) (B) such that at least 15 percent of copolymer, based upon the weight of total copolymer, is crosslinked;

(b) from 0 to about 25 percent by weight of filler;

(c) from 0 to about 5 percent by weight of antioxidant;

(d) from about 39 to about 85 percent by weight of tackifier; and (e) from about 0.5 to about 25 percent by weight of plasticizer.

12. The composition of claim 11 wherein said polar comonomer is selected from the group consisting of vinyl acetate, methyl acrylate and ethyl acrylate.

13. The composition of claim 12 wherein said polar comonomer is vinyl acetate and wherein the vinyl acetate content of copolymer (A) is from about 30 to about 44 percent by weight.

14. The composition of claim 13 wherein said tackifier is selected from the group consisting of rosin acids derived from wood, gum or tall oil and their hydrogenated, disproportionated, mildly polymerized or ester derivatives; terpene resins; dicyclopentadiene-aromatic hydrocarbon resins; and low molecular weight styrene or substituted styrene resins.

15. The composition of claim 14 wherein said tackifier is selected from the group consisting of dicyclopentadiene aromatic hydrocarbon resins and rosin acids derived from wood, gum or tall oil and their hydrogenated, disproportionated, mildly polymerized or ester derivatives.

16. The composition of claim 14 wherein plasticizer is selected from the group consisting of phthalates, azelates, adipates, tricresyl phosphate, polyesters, and low molecular weight alkylated phenol, phenol-modified coumarone-indene, terpene and synthetic terpene resins, and processing oils.

17. The composition of claim 16 wherein (a) said mixture of at least one ethylene copolymer (A) and at least one ethylene copolymer (B) is present in an amount of from about 20 to about 40 percent by weight, copolymer (A) having a polar comonomer content of from about 38 to about 42 percent by weight, an ethylene content of from about 58 to about 62 percent by weight and a melt index of from about 30 to about 90, copolymer (B) having a polar comonomer content of from about 18 to about 28 percent by weight, an ethylene content of from about 72 to about 82 percent by weight and a melt index of from about 2 to about 25, copolymer(s) (A) being present in an amount of from about 15 to about 85 percent based upon the weight of total copolymer and copolymer(s) (B) being present in an amount of from about 15 to about 85 percent based upon the weight of total copolymer, at least one copolymer of said copolymer(s) (A) and copolymer(s) (B) having been mildly crosslinked to reduce its melt index by a factor of from about 10 to about 100 for copolymer(s) (A) and by a factor of from about 10 to about 60 for copolymer(s) (B) such that at least 25 percent of copolymer, based upon the weight of total copolymer, is crosslinked;

(b) said filler is present in an amount of from 0 to about 20 percent by weight;

(c) said antioxidant is present in an amount of from about 0.1 to about 2 percent by weight;

(d) said tackifier is a blend of at least two tackifiers and is present in an amount of from about 49 to about 79 percent by weight; and (e) said plasticizer is present in an amount of from about 1 to about 20 percent by weight.

18. The composition of claim 17 wherein (a) said mixture of at least one ethylene copolymer (A) and at least one ethylene copolymer (b) is present in an amount of from about 25 to about 35 percent by weight, copolymer(s) (A) being present in an amount of from about 30 to about 70 percent based upon the weight of total copolymer and copolymer(s) (B) being present in an amount of from about 30 to about 70 percent based upon the weight of total copolymer; and (d) said blend of at least two tackifiers is present in an amount of from about 54 to about 74 percent by weight.

* * * * *